United States Patent
Namiki et al.

(10) Patent No.: US 12,125,644 B2
(45) Date of Patent: Oct. 22, 2024

(54) MULTILAYER CERAMIC CAPACITOR AND METHOD FOR MANUFACTURING THE SAME

(71) Applicant: TAIYO YUDEN CO., LTD., Tokyo (JP)

(72) Inventors: Satoko Namiki, Takasaki (JP); Koichiro Morita, Takasaki (JP); Minoru Ryu, Takasaki (JP); Natsumi Yuzakino, Takasaki (JP)

(73) Assignee: TAIYO YUDEN CO., LTD, Tokyo (JP)

( * ) Notice: Subject to any disclaimer, the term of this patent is extended or adjusted under 35 U.S.C. 154(b) by 121 days.

(21) Appl. No.: 18/163,211

(22) Filed: Feb. 1, 2023

(65) Prior Publication Data
US 2023/0268130 A1 Aug. 24, 2023

(30) Foreign Application Priority Data
Feb. 22, 2022 (JP) .................... 2022-025807

(51) Int. Cl.
*H01G 4/30* (2006.01)
*C04B 35/468* (2006.01)
*C04B 35/64* (2006.01)
*H01G 4/008* (2006.01)
*H01G 4/012* (2006.01)
*H01G 4/12* (2006.01)

(52) U.S. Cl.
CPC ........... *H01G 4/30* (2013.01); *C04B 35/4682* (2013.01); *C04B 35/64* (2013.01); *H01G 4/008* (2013.01); *H01G 4/012* (2013.01); *H01G 4/1227* (2013.01)

(58) Field of Classification Search
CPC .... C04B 35/4682; C04B 35/64; H04G 4/008; H04G 4/12; H04G 4/1209; H04G 4/1227; H04G 4/30
See application file for complete search history.

(56) References Cited

U.S. PATENT DOCUMENTS

2016/0104576 A1\* 4/2016 Park ................. H01G 4/008
361/301.4

FOREIGN PATENT DOCUMENTS

| JP | 2003040671 | A |   | 2/2003 |
|----|------------|---|---|--------|
| JP | 2004345927 | A |   | 12/2004 |
| JP | 2007269542 | A | * | 10/2007 |
| JP | 2021052149 | A | * | 4/2021 |

\* cited by examiner

*Primary Examiner* — Nathan Milakovich
(74) *Attorney, Agent, or Firm* — Law Office of Katsuhiro Arai (57) ABSTRACT

One aspect of the present invention is a multilayer ceramic capacitor including a plurality of dielectric layers composed of a dielectric ceramic containing grains whose main component is barium titanate having a core-shell structure made up of a core part and a shell part, and grains whose main component is calcium titanate having a core-shell structure made up of a core part and a shell part; and a plurality of internal electrodes stacked alternately with each of the plurality of dielectric layers.

17 Claims, 3 Drawing Sheets

MULTILAYER CERAMIC CAPACITOR AND METHOD FOR MANUFACTURING THE SAME

CROSS-REFERENCE TO RELATED APPLICATIONS

The present application claims priority to Japanese Patent Application No. 2022-025807, filed Feb. 22, 2022, the disclosure of which is incorporated herein by reference in its entirety including any and all particular combinations of the features disclosed therein.

BACKGROUND

Field of the Invention

The present invention relates to a multilayer ceramic capacitor and a method for manufacturing the same.

Description of the Related Art

In recent years, as digital electronic devices, such as cell phones, are reduced in size and thickness, size reduction and large capacity of multilayer ceramic capacitors that are surface-mounted on electronic circuit boards, etc. have progressed. The multilayer ceramic capacitors have a structure in which individual layers of a ceramic dielectric layer that is a dielectric, and a conductor layer that is an internal electrode are alternately stacked.

In general, a smaller size of a capacitor creates a smaller area of the internal electrodes facing each other via the dielectric interposed therebetween, and therefore, capacitance decreases. For that reason, a high-density stacking technology for reducing the thickness of layers of the dielectric and the internal electrodes, and also for stacking them in multiple layers, is indispensable to maintaining capacitance while reducing the size of capacitors. Additionally, a further reliability improvement is required for multilayer ceramic capacitors amid deepening rapid size reduction and large capacity.

Various kinds of dielectric ceramics composed mainly of barium titanate ($BaTiO_3$) (hereinafter also referred to as "BT") having a high specific dielectric constant have been conventionally used for multilayer ceramic capacitors. Among them, one in which sintered compact crystalline grains have a core-shell structure has been known as a dielectric ceramic having good temperature characteristics of capacitance and also having excellent service life characteristics.

For example, a dielectric ceramic of a core-shell structure with less temperature change in dielectric constant is obtainable by adding a subcomponent containing rare earth elements, etc. to BT that is a main component, followed by sintering while inhibiting grain growth (refer to Patent Literature 1).

Patent Literature 1 says that main component powder is used as a starting material, which is composed of $ABO_3$-based compound [A is Ba (barium), Ba and Ca (calcium), or Ba, Ca, and Sr (strontium); B is Ti (titanium), or Ti and Zr (zirconium)], and which has an average grain size of 0.1 μm to 0.3 μm. It also says that requirements for obtaining predetermined temperature characteristics are that crystals of ceramic after being subjected to sintering satisfy the condition: (Core diameter)<0.4×(Grain diameter), and an average grain diameter thereof is in a range of 0.15 μm to 0.8 μm.

In the meantime, BT-based dielectric ceramics are capable of increasing specific dielectric constant, but have a large temperature change rate of capacitance when being made into a ceramic capacitor. Various proposals have been conventionally made in order to flatten the temperature change rate of capacitance.

For example, Patent Literature 2 has proposed to apply, to a dielectric layer, dielectric ceramics having perovskite-type barium titanate crystalline grains (BCT-type crystalline grains) in which a part of A-site is substituted with Ca, and perovskite-type barium titanate crystalline grains (BT-type crystalline grains) containing no substituent Ca.

BACKGROUND ART LITERATURES

Patent Literature 1: Japanese Patent Laid-open No. 2004-345927
Patent Literature 2: Japanese Patent Laid-open No. 2003-40671

SUMMARY

In recent years, higher integration in chip-type multilayer ceramic capacitors and thin dielectric layers have been required, and there are not a few cases of forming a dielectric layer composed of dielectric ceramic in a thickness of 0.6 μm or less. In this case, if a grain size of the dielectric ceramic falls within the range (0.15 μm to 0.8 μm) in the above-described conventional technology (Patent Literature 1), a thickness of the dielectric layer is approximately equal to the grain size, thus failing to maintain a sufficient number of grain boundaries between internal electrode layers. As a result, short circuits (electrical short circuit) and cracks (structural deficiency), etc. are likely to occur, and these can cause deterioration of reliability as a product.

Patent Literature 2 also says that a multilayer ceramic capacitor excellent in temperature characteristics of capacitance and in high-temperature load service life is obtainable by achieving a coexisting structure of BT-type crystalline grains showing high specific dielectric constant, and BCT-type crystalline grains which is excellent in DC bias property, that is, causes a small drop in capacitance when applying a DC voltage. It also says that a thickness of the dielectric layer in this case is preferably 4 μm or less.

However, if the thickness of the dielectric layer is reduced to 0.6 μm or less, the length of service life of the dielectric layer becomes shorter, resulting in deterioration of the reliability of the multilayer ceramic capacitor.

The present invention has been made in view of the above problems, and aims at providing a multilayer ceramic capacitor that has anti-reduction properties and is excellent in high-temperature load service life, in which even when a thickness of a dielectric layer is 0.6 μm or less, a specific dielectric constant of the dielectric layer is high, and at the same time has stable temperature characteristics of capacitance that conform to X6S properties of EIA standards, specifically, a change rate ($\Delta C$) of capacitance in a temperature range of −55° C. to +105° C. falls within ±22%. The present invention also aims at providing a method for manufacturing the multilayer ceramic capacitor.

After considering in order to achieve the aforementioned objects, the inventor of the present invention found that a dielectric ceramic containing grains whose main component is barium titanate having a core-shell structure (hereinafter also referred to as "BT grains") and grains whose main component is calcium titanate having a core-shell structure (hereinafter also referred to as "CT grains") is obtainable by using ceramic raw material powder in which barium titanate and calcium titanate having a larger average grain size than the barium titanate are mixed together, and by sintering the ceramic raw material powder. The inventor also found that a multilayer ceramic capacitor having anti-reduction properties, in which a specific dielectric constant of the dielectric layer is high, and at the same time has stable temperature characteristics of capacitance that conform to X6S properties of EIA standards and is excellent in high-temperature load service life, is obtainable by using the dielectric ceramic. Eventually, the inventor completed the present invention.

To be specific, one aspect of the present invention to solve the above problems encompasses the following: A multilayer ceramic capacitor including: a plurality of dielectric layers composed of a dielectric ceramic containing grains whose main component is barium titanate having a core-shell structure made up of a core part and a shell part, and grains whose main component is calcium titanate having a core-shell structure made up of a core part and a shell part; and a plurality of internal electrodes stacked alternately with each of the plurality of dielectric layers.

Another aspect of the present invention encompasses the following: A method for manufacturing a multilayer ceramic capacitor including: a preliminary step of preparing ceramic raw material powder by blending barium titanate powder and calcium titanate powder having a larger average grain size than the barium titanate powder, and by adding a subcomponent raw material thereto; a sheet formation step of forming ceramic green sheets by using the obtained ceramic raw material powder; a printing step of printing internal electrode patterns on the obtained ceramic green sheets; a stacking step of forming a laminate body by stacking and pressure-bonding the ceramic green sheets after being subjected to the printing step; a step of obtaining a sintered compact by sintering the obtained laminate body; and a step of forming an external electrode on both of one pair of opposing side surfaces of the obtained sintered compact.

With the present invention, it is possible to provide a multilayer ceramic capacitor having anti-reduction properties and is excellent in high-temperature load service life, in which even when a thickness of a dielectric layer is reduced to 0.6 μm or less, a specific dielectric constant of the dielectric layer is as high as 1500 or more, and at the same time has stable temperature characteristics of capacitance which conform to X6S properties of EIA standards. It is therefore possible to achieve both good temperature characteristics and long service life in a miniaturized multilayer ceramic capacitor.

DESCRIPTION OF THE SYMBOLS

1: multilayer ceramic capacitor
10: sintered compact
12: dielectric layer (dielectric ceramic)
13: internal electrode layer
15: protection region (cover layer)
20: external electrode
30: core part
31: shell part

DETAILED DESCRIPTION OF EMBODIMENTS

The constitutions as well as operations and effects of the present invention are explained below, together with the technical concepts, by referring to the drawings. It should be noted, however, that the mechanisms of operations include estimations, and whether they are correct or incorrect does not limit the present invention in any way. It should be noted that where a numerical range, etc. is indicated using "to", it denotes that numerical values indicated as a lower limit and an upper limit are also included. In some embodiments, the upper limit and/or the lower limit can be excluded from a numeral range.

[Multilayer Ceramic Capacitor]

Figure 1:
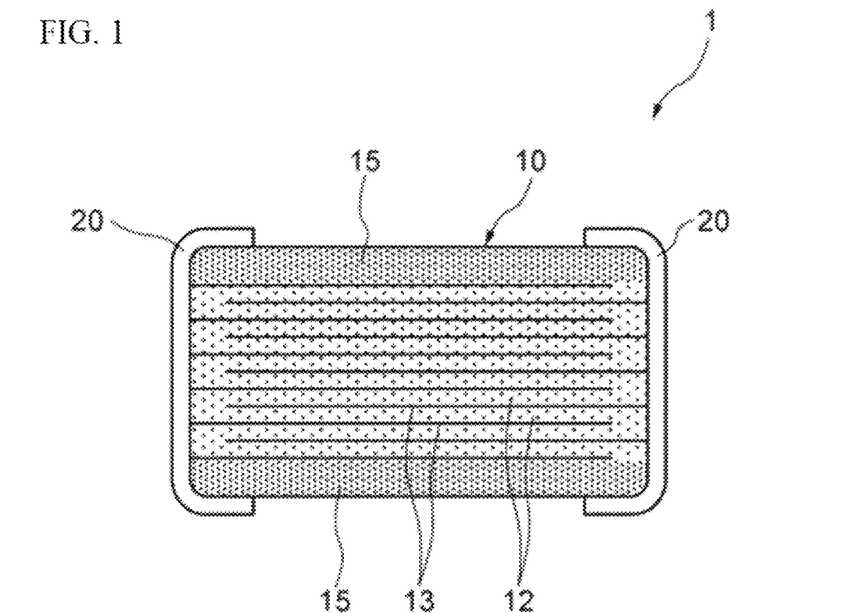
FIG. 1 is a schematic cross-sectional view of a multilayer ceramic capacitor.

FIG. 1 is a schematic cross-sectional view illustrating an embodiment of one aspect directed to a multilayer ceramic capacitor (hereinafter referred to as "a first aspect") of a multilayer ceramic capacitor according to one aspect of the present invention.

As illustrated in FIG. 1, the multilayer ceramic capacitor 1 according to the first aspect includes a sintered compact 10 having a rectangular solid shape, and a pair of external electrodes 20 and 20 that are different in polarity and disposed on both of any one pair of opposing side surfaces of the sintered compact 10. A part of each of the external electrodes 20 and 20 wraps around upper and lower surfaces of the sintered compact 10.

The sintered compact 10 has a laminate body in which a plurality of dielectric layers 12 and a plurality of internal electrode layers 13 are stacked alternately, and a protection region (cover layer) 15 to cover at least a part of the laminate body. Edges of the individual internal electrode layers 13 are alternately led out to a pair of external electrodes 20 and 20 disposed on both end parts of the sintered compact 10, and are electrically connected to the external electrodes 20 and 20.

The protection region 15 is disposed to protect the dielectric layer 12 and the internal electrode layer 13 from moisture and contamination, etc. from the outside, and prevent deterioration over time. The protection region 15 is also disposed on both surface sides (not illustrated) which are parallel to a stacking direction of the laminate body, and where the external electrodes 20 and 20 are not disposed. A material of the protection region 15 is the same as the main component of the dielectric ceramic constituting the dielectric layer 12.

In the first aspect, a thickness of the dielectric layer 12 is preferably 0.6 μm or less in terms of thickness after sintering, more preferably 0.5 μm or less, and still more preferably 0.4 μm or less. The number of the stacked dielectric layers 12 can be increased by reducing the thickness of the dielectric layer 12, and consequently the capacity of the multilayer ceramic capacitor 1 can be increased without increasing dimensions of the laminate body.

Individual layers and members constituting the multilayer ceramic capacitor according to the first aspect are described below.

(Dielectric Layer)

The dielectric layer 12 in the multilayer ceramic capacitor 1 according to the first aspect is composed of a dielectric ceramic obtainable by sintering ceramic raw material powder in which barium titanate (BT) and calcium titanate (CT) are mixed together. The dielectric ceramic obtained by sintering contain BT grains and CT grains, and each of the grains has a core-shell structure made up of a core part and a shell part. Consequently, high-temperature load service life is improved in addition to obtaining a high specific dielectric constant and good temperature characteristics of capacitance.

As used herein, "the core-shell structure made up of the core part and the shell part" denotes a crystal grain structure in which a main component is kept in a central portion (core part) of a crystalline grain and a subcomponent is dissolved in an outer shell portion (shell part).

Figure 2:
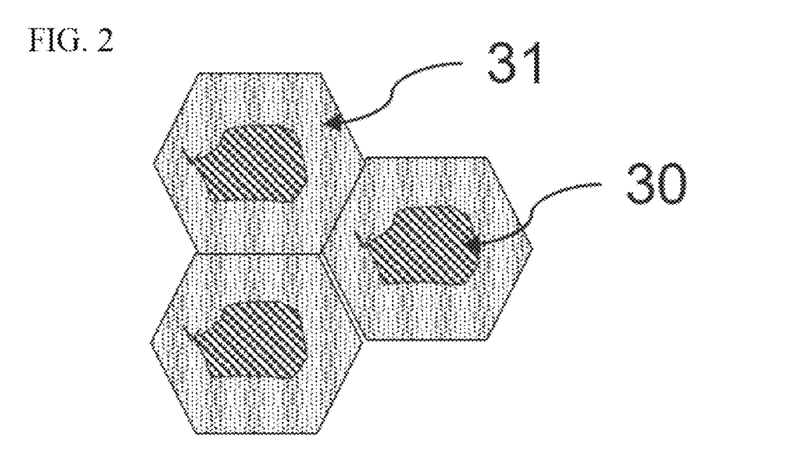
FIG. 2 is a cross-sectional view schematically illustrating a core-shell structure.

FIG. 2 is a cross-sectional view schematically illustrating a core-shell structure. In FIG. 2, 30 represents "core part", and 31 represents "shell part."

In the first aspect, the presence of grains of the core-shell structure in the dielectric ceramic constituting the dielectric layer 12 can be confirmed by sectioning an arbitrary surface of the dielectric layer 12 up to a thickness at which it is possible to carry out a scanning transmission electron microscope (STEM) observation, and by carrying out the STEM observation of a cross section.

Figure 3:
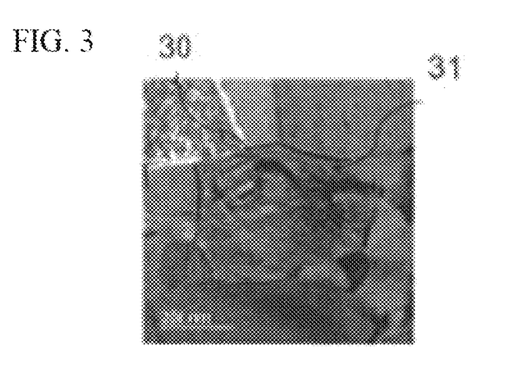
FIG. 3 is a scanning transmission electron microscope image obtained by observing a core-shell part of CT grains obtained in Example 2.

FIG. 3 is an STEM image obtained by observing the core-shell part of the CT grains in the dielectric layer 12 according to a multilayer ceramic capacitor obtained in Example 2 described later. The STEM image is one which is obtained by observing with the scanning transmission electron microscope (STEM) a sample obtained by reducing the thickness of the dielectric layer by polishing, and finally sectioning an observation portion with gallium ion beam.

Additionally, the presence of the BT grains and the CT grains, each having the core-shell structure, in the dielectric ceramic constituting the dielectric layer 12 can be confirmed by obtaining an element mapping image from an obtained STEM image by Energy Dispersive X-ray Spectroscopy (EDS), and by confirming contrast of the mapping image. The fact that the crystalline grains observable in FIG. 3 are the CT grains has been confirmed by this procedure.

Furthermore, an element concentration of the core part and the shell part in each of the BT grains and the CT grains, each having the core-shell structure, can be confirmed by making EDS analysis of a micro region.

Individual element concentrations in the dielectric layer 12 can also be analyzed with Inductively Coupled Plasma (ICP) emission spectral analysis.

Figure 4:
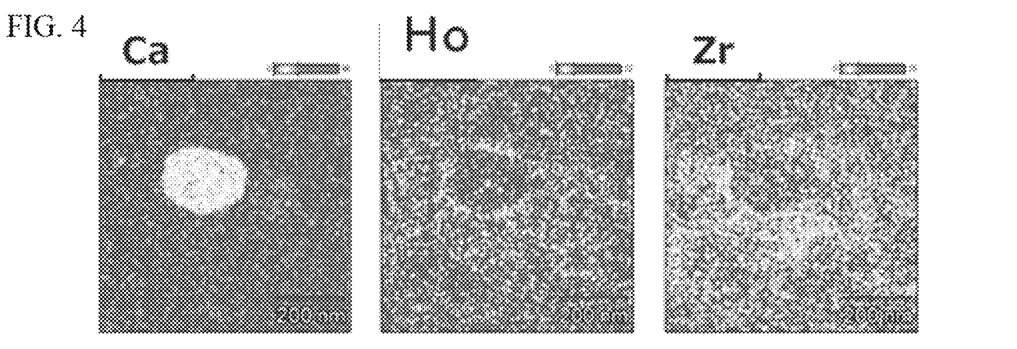
FIG. 4 is element mapping images by EDS in the core-shell part of CT grains obtained in Example 2.
Figure 5:
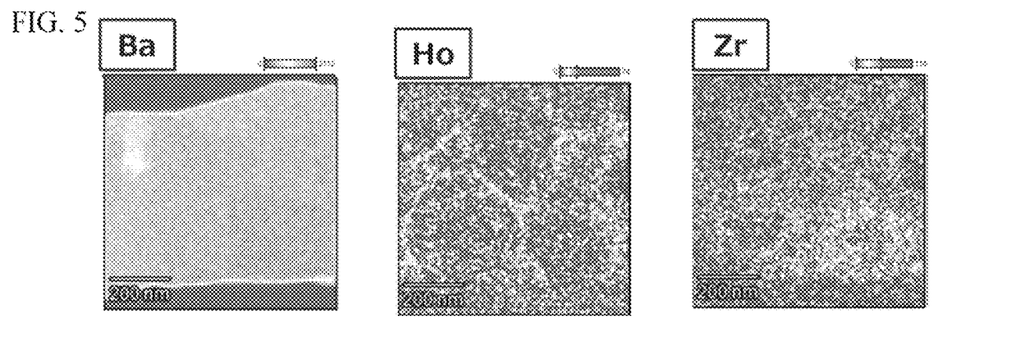
FIG. 5 is element mapping images by EDS in a core-shell part of BT grains obtained in Example 2.

FIG. 4 is element mapping images by EDS in the core-shell part of the CT grains obtained in Example 2 described later. FIG. 5 is element mapping images by EDS in the core-shell part of the BT grains obtained in Example 2 described later. In FIG. 4, the image on the left indicates image data of calcium (Ca), the image in the center indicates image data of holmium (Ho), and the image on the right indicates image data of zirconium (Zr). In FIG. 5, the image on the left indicates image data of barium (Ba), the image in the center indicates image data of holmium (Ho), and the image on the right indicates image data of zirconium (Zr). It should be noted that as described later, Ho and Zr are subcomponents.

As indicated in the image on the left in FIG. 5, Ba is present evenly in the shell part and the core part in the BT grains having the core-shell structure.

In contrast, as indicated in the image on the left in FIG. 4, there is more Ca in the core part than in the shell part, and Ca concentration changes greatly at a boundary between the core part and the shell part in the CT grains having the core-shell structure.

In the first aspect, a content rate of Ca in the core part is preferably not less than four times a content rate of Ca in the shell part in the CT grains contained in the dielectric ceramic. This contributes to obtaining more excellent temperature characteristics of capacitance and service life characteristics.

As indicated in each of the images in the center and on the right in FIGS. 4 and 5, there is more of the subcomponents, such as Ho and Zr, in the shell part than in the core part, in both BT grains and the CT grains. The concentration of the subcomponents changes greatly at the boundary between the core part and the shell part in each of the BT grains and the CT grains. However, if an additive amount of the subcomponents is small, a concentration change thereof does not become clear at the boundary between the core part and the shell part in some cases.

The dielectric ceramic constituting the dielectric layer 12 in the multilayer ceramic capacitor 1 according to the first aspect preferably contains barium and calcium in such an amount that a mole percentage of calcium relative to a total of barium and calcium ($Ca/(Ba+Ca) \times 100$) becomes 22 to 25 mol %. Within this range, the dielectric ceramic becomes one which contains a large number of grains having the core-shell structure, and excellent properties are obtainable.

In the first aspect, an average crystalline grain size of the BT grains in the dielectric ceramic constituting the dielectric layer 12 is preferably 200 nm or more and 500 nm or less, more preferably 200 nm or more and 400 nm or less. Also, an average crystalline grain size of the CT grains in the dielectric ceramic constituting the dielectric layer 12 is preferably 200 nm or more and 400 nm or less, more preferably 200 nm or more and 300 nm or less.

It should be noted that in the present specification, the average crystalline grain size of the BT grains and the CT grains are obtained as follows. That is, a polished surface of the dielectric layer after polishing is observed with a scanning electron microscope (SEM). A maximum diameter and a minimum diameter are measured on each of 100 crystalline grains, and an average value is calculated based on these. That is, a sum of the maximum diameters and the minimum diameters of the individual crystalline grains is divided by 200.

Although the dielectric ceramic constituting the dielectric layer 12 includes CT in the ceramic raw material powder thereof as described above in the first aspect, sintering properties may often deteriorate by addition of the CT, and it is therefore preferable to add glass such as Li—Ba—B—Si based glass, and a sintering additive such as LiF.

The added glass and sintering additive form an amorphous phase in a sintering process of the ceramic raw material powder, and is present in a grain boundary between the BT grains and the CT grains in the dielectric ceramic according to the first aspect.

The dielectric ceramic may contain a predetermined subcomponent depending on the purpose in the first aspect.

Examples of preferable subcomponents in the first aspect include a rare earth element selected from the group consisting of Ho, dysprosium (Dy), yttrium (Y), and ytterbium (Yb), and at least one element selected from the group consisting of Zr, magnesium (Mg), manganese (Mn), and silicon (Si).

Of the above subcomponents, at least one rare earth element selected from the group consisting of Ho, Dy, Y, and Yb has an action to improve DC bias properties of the dielectric layer and service life characteristics in a load test in the first aspect.

As described above, there is much more Ho being the rare earth element in the shell part than in the core part.

In the first aspect, a content of the rare earth element in the dielectric ceramic is preferably 0.4 to 2.0 at %, more preferably 0.6 to 1.5 at %, and still more preferably 0.8 to 1.2 at % if Ti is taken as 100 at %.

Of the above subcomponents, Mg, Mn, and Zr have an action to impart anti-reduction properties to the dielectric ceramic when sintering the dielectric layer 12 in the first aspect.

As described above, there is more of the subcomponents, such as Zr, in the shell part than in the core part.

Particularly because Zr has high anti-reduction properties, by covering the core part with the shell part having a high content of Zr, it is possible to obtain a dielectric ceramic having a stable structure and high reliability while keeping specific dielectric constant high.

In the first aspect, a content of each of Mg, Mn, and Zr in the dielectric ceramic is preferably 0.5 to 7.0 at %, more preferably 1.0 to 6.0 at %, and still more preferably 2.0 to 5.0 at % if Ti is taken as 100 at %.

In the first aspect, among the above subcomponents, Si functions as a sintering additive, and has a function to lower sintering temperature.

In the first aspect, Si is contained in an amount of preferably 0.3 to 3.0 at %, more preferably 0.5 to 2.5 at %, and still more preferably 0.8 to 2.0 at % if Ti is taken as 100 at % in the dielectric ceramic.

(Internal Electrode)

There is no particular limitation on a conductive material that forms the internal electrode layer 13. For example, at least one kind of metal material selected from the group consisting of nickel (Ni), copper (Cu), palladium (Pd), platinum (Pt), silver (Ag), and gold (Au) is used, and a base metal, such as Ni and Cu, is preferable from the viewpoint that manufacturing costs are reducible even with a high number of stacked layers, and particularly Ni is more preferable from the viewpoint that it is possible to achieve simultaneous sintering with the dielectric layer 12 in the present invention.

The internal electrode layer 13 may contain ceramic grains having a composition similar to that of the dielectric ceramic that is the main component of the dielectric layer 12. The composition of the ceramic grains may be slightly different from that of the dielectric ceramics, but preferably the same as that of the dielectric ceramic.

Although there is no particular limitation on the thickness of the internal electrode layer 13, it is usually 0.26 to 1.00 µm.

(External Electrode)

The external electrode 20 can be formed by applying and baking an external electrode paste containing a conductive material and glass powder on a surface of the laminate body exposed to both end surfaces of the sintered compact 10. The external electrode 20 may be formed by applying an underlayer to the surface of the laminate body exposed to both end surfaces of the sintered compact 10, followed by metal coating of Ni, Cu, Sn (tin), etc. by plating treatment. Alternatively, the external electrode 20 may be formed by deposition on both end surfaces of the laminate body of the sintered compact 10 by sputtering method, etc.

[Method for Manufacturing Multilayer Ceramic Capacitor]

A method for manufacturing a multilayer ceramic capacitor according to another aspect of the present invention is described employing an embodiment of the aspect directed to a method for manufacturing a multilayer ceramic capacitor (hereinafter referred to as "a second aspect").

(Ceramic Raw Material Powder Preparation Step)

In the second aspect, one in which BT powder and CT powder having a larger average grain size than the BT powder are blended together is used as a main component raw material. And, ceramic raw material powder is prepared as a subcomponent raw material by adding, to the main component raw material, at least one rare earth element selected from the group consisting of Ho, Dy, Y, and Yb, as well as Zr, Mg, Mn, and Si, etc. in the form of oxide and other compounds, etc. Further, sintering additives such as glass, LiF, etc. may be added as needed to the ceramic raw material powder.

It has conventionally been known that the BT powder and the CT powder can be manufactured with various methods, such as sol-gel method, solid-phase method, and hydrothermal method. The BT powder and the CT powder used in the second aspect may be ones which are manufactured with any one of these methods. Among them, one which is manufactured with sol-gel method can be suitably used because it is composed of fine grains which have a narrow grain size distribution, specifically, are uniform in grain size.

In order to obtain a dielectric ceramic containing the BT grains and the CT grains, each having the above core-shell structure, by sintering the ceramic raw material powder in the second aspect, an average grain size of the CT powder in the ceramic raw material powder is preferably larger than an average grain size of the BT powder. Specifically, one whose average grain size is 20 nm or more and 150 nm or less is suitably used as the BT powder, and one whose average grain size is 200 nm or more and 300 nm or less is suitably used as the CT powder.

Also, in order to obtain a dielectric ceramic containing the BT grains and the CT grains, each having the above core-shell structure, by sintering the ceramic raw material powder in the second aspect, the BT powder and the CT powder in the ceramic raw material powder are preferably blended at a ratio of 78:22 to 75:25 in a molar ratio. In other words, a mole percentage of the CT in the main component raw material is preferably within a range of 22 to 25 mol %. By blending within this range, a dielectric ceramic containing a large number of grains having the core-shell structure is obtainable, and the multilayer ceramic capacitor becomes excellent in properties.

(Ceramic Green Sheet Formation Step)

In the second aspect, a ceramic green sheet can be manufactured by applying and drying a slurry, which is manufactured by adding a binder and a solvent to the above ceramic raw material powder, followed by wet mixing with a ball mill, on a surface of a base material, such as a plastic film, by using a coater, such as a doctor blade and die coater.

Each of a thickness of the slurry applied to the base material and a thickness of the ceramic green sheet after drying is preferably set so that a thickness after a sintering step described later can become 0.6 µm or less.

There is no particular limitation on the binder in the slurry as long as it allows for forming the ceramic raw material powder into a sheet shape and maintain the shape thereof, and it also can be removed without residues such as a carbon component by heating prior to the sintering described later. As an example, a polyvinyl acetal resin including a polyvinyl butyral can be used.

There is also no particular limitation on the solvent used for preparing the slurry, and ethanol and toluene, etc. can be used. Furthermore, a plasticizer, such as dioctyl phthalate (DOP), may be added as needed to the slurry.

A content of each of the components in the slurry is suitably controlled depending on an employed method for forming a green sheet and the thickness of the green sheet, etc.

(Printing Step of Internal Electrode Layer Pattern)

In the second aspect, prior to a printing step of an internal electrode layer pattern, a conductive paste for forming an internal electrode layer is manufactured by mixing a conductive material and a binder together. There is no particular limitation on the conductive material, and it is possible to use at least one kind of metal material selected from the group consisting of, for example, Ni, Cu, Pd, Pt, Ag, Au, and alloys thereof. Among them, base metals, such as Ni and Cu, can be preferably used. The binder is preferably the same as the one used in the above-mentioned ceramic green sheet manufacturing. Ceramic grains having a composition similar to that of the ceramic raw material powder may be added to the conductive paste for forming the internal electrode layer. The composition of the ceramic grains may be slightly different from that of the ceramic raw material powder, but is preferably the same as that of the ceramic raw material powder.

In the printing step of the internal electrode layer pattern, a pattern of the internal electrode layer is printed using the conductive paste for forming the internal electrode layer on a surface of the ceramic green sheet by screen printing, gravure printing, etc.

(Stacking and Cutting Step)

The ceramic green sheet with the internal electrode layer pattern printed thereon is stamped out in a predetermined size, and the base material is separated from the stamped-out ceramic green sheet, and thereafter a predetermined number of layers are stacked one upon another so that surfaces with the internal electrode layer pattern printed thereon can be directed to the same side. In this case, the internal electrode layer patterns are arranged so that the ceramic green sheets adjacent to each other can be different in position in a length direction of the pattern. The ceramic green sheets after stacking are pressure-bonded and then cut in predetermined chip dimensions so as to obtain multilayer chips with a method, such as pressing and cutting, and blade dicing.

(Sintering Step)

The obtained multilayer chips are subjected to a sintering process. Prior to the sintering process, a binder removal process of removing organic materials, such as the binder, etc. contained in the ceramic green sheets and the internal electrode layer pattern is carried out. There is no particular limitation on conditions of the binder removal process as long as it is possible to remove the binder while suppressing oxidization of metals contained in the internal electrode layer pattern. As an example, heating to 250 to 500° C. in an $N_2$ atmosphere can be exemplified.

Individual compounds constituting the ceramic raw material powder react with each other and grow into grains having the core-shell structure by carrying out sintering in a reduction atmosphere composed of $N_2$ and $H_2O$ after the binder removal process.

Sintering process temperature and sintering time are controlled so that the CT and the BT in the ceramic raw material powder can be sintered in the reduction atmosphere, and an average crystalline grain size of the CT grains can become 200 nm or more and 500 nm or less, and an average crystalline grain size of the BT grains can become 200 nm or more and 400 nm or less so as to obtain the multilayer ceramic capacitor having predetermined properties. As preferable sintering process temperature and time, 1100 to 1300° C. and 10 minutes to 2 hours can be exemplified.

Furthermore, an annealing process at 600 to 1000° C. in an $N_2$ atmosphere may be carried out at a middle stage of temperature lowering from the sintering temperature.

Thus, a capacitor body (sintered compact 10) is obtained in which the dielectric layers 12 and the internal electrode layers 13 are alternately stacked one upon another.

(External Electrode Formation Step)

The external electrode 20 is formed by baking an external electrode paste containing a metal material containing at least one kind selected from the group consisting of, for example, Ni, Cu, Pd, Pt, Ag, Au, Sn, and alloys thereof, and glass powder, on both end parts of the obtained sintered compact 10. Alternatively, the external electrode may be deposited on both end surfaces of the laminate body by sputtering method, etc.

EXAMPLES

The present invention is described more specifically below using examples; however, the present invention is not limited to these specific examples. It should be noted that various modifications and changes can be made within the scope of the present invention described in claims.

Example 1

One in which BT having an average grain size of 125 nm manufactured by sol-gel method and CT having an average grain size 200 nm manufactured by sol-gel method were blended at a ratio of BT:CT=78:22 in a molar ratio was prepared as a main component raw material powder.

Individual oxides of Ho (rare earth element), Mg, Mn, Si, and Zr were added to the main component raw material powder so that Ho=1.0 at %, Mg=0.5 at %, Mn=0.5 at %, Si=1.5 at %, and Zr=4.0 at % if Ti in the dielectric ceramic constituting the di electric layer was taken as 100 at %. Furthermore, Li—Ba—B—Si based glass that was a sintering additive was added so as to be 0.5 mass % relative to the main component raw material powder, thereby obtaining ceramic raw material powder.

A ceramic slurry was manufactured by adding polyvinyl butyral-based binder, ethanol, and toluene to the obtained ceramic raw material powder, followed by wet mixing with a ball mill. The ceramic slurry was formed into a sheet shape, thereby obtaining a ceramic green sheet.

Subsequently, an internal electrode layer pattern that would become the internal electrode was formed by screen printing a conductive paste containing Ni on the ceramic green sheet. Furthermore, the ceramic green sheets with the internal electrode layer patterns formed thereon, respectively, were stacked and pressure-bonded in a manner that the internal electrode layer patterns were led out to different sides alternately, and then cut to the specified dimensions to obtain multilayer chips that would become capacitor bodies.

The obtained multilayer chips were subjected to a binder removal process by heating to a temperature of 300° C. in an $N_2$ atmosphere. The multilayer chips after the binder removal process were sintered at 1200° C. in a reduction atmosphere composed of $N_2$ and $H_2O$. After sintering, an annealing process at 700° C. in an $N_2$ atmosphere was carried out at a middle stage of temperature lowering. The capacitor body (sintered compact) formed by sintering the multilayer chips was obtained by the above procedure.

Subsequently, an external electrode was formed by applying an external electrode paste containing Cu and glass powder to both end parts where the internal electrode was led out, followed by baking at 900° C., thereby obtaining a multilayer ceramic capacitor.

External dimensions of the multilayer ceramic capacitor thus obtained were 0.5 mm in width, 1.0 mm in length, and 0.5 mm in height. Also, the number of the stacked dielectric layers each sandwiched between the internal electrodes was 10 layers, and an average layer thickness per layer was 0.4 µm.

Example 2

A multilayer ceramic capacitor was manufactured in the same manner as in Example 1, except that the blending ratio of BT and CT in main component raw materials was changed to BT:CT=77:23 in a molar ratio.

Example 3

A multilayer ceramic capacitor was manufactured in the same manner as in Example 1, except that the blending ratio of BT and CT in main component raw materials was changed to BT:CT=76:24 in a molar ratio.

Example 4

A multilayer ceramic capacitor was manufactured in the same manner as in Example 1, except that the blending ratio of BT and CT in main component raw materials was changed to BT:CT=75:25 in a molar ratio.

Comparative Example 1

A multilayer ceramic capacitor was manufactured in the same manner as in Example 1, except that only BT having an average grain size of 125 nm formed by the sol-gel method was used as main component raw materials, no Zr was added to the main component raw materials, and the sintering temperature was 1250° C.

[Confirmation of BT Grains and CT Grains Each Having Core-Shell Structure]

In each of the multilayer ceramic capacitors obtained in the individual Examples and Comparative example, the dielectric layer was polished to form a thin plate, and eventually an observation portion thereof was made into a thin piece with gallium ion beam. The observation portion was observed with a scanning transmission electron microscope (STEM). Subsequently, the presence of BT grains and CT grains, each having the core-shell structure, in the dielectric ceramic constituting the dielectric layer was confirmed by obtaining an element mapping image from the obtained STEM image by Energy Dispersive X-ray Spectroscopy (EDS), and by confirming contrast of the mapping image. As a representative of results, an STEM image obtained in the multilayer ceramic capacitor according to Example 2 is illustrated in FIG. 3. The element mapping image of the CT grains confirmed in the STEM image is illustrated in FIG. 4. An element mapping image of the BT grains confirmed in the STEM image is illustrated in FIG. 5.

[Calculation of Average Crystalline Grain Size of BT Grains and CT Grains]

In each of the multilayer ceramic capacitors obtained in the individual Examples and Comparative Example, a polished surface of the dielectric layer was observed with a scanning electron microscope (SEM), and a maximum diameter and a minimum diameter were measured on each of 100 crystalline grains, and an average value was taken as an average crystalline grain size. The results are presented in Table 1.

[Calculation of Mole Percentage of Calcium Relative to Sum of Barium and Calcium of Dielectric Layer]

In each of the multilayer ceramic capacitors obtained in the individual Examples and Comparative Example, a part of the dielectric layer was subjected to ICP analysis. A mole percentage of calcium relative to a total of barium and calcium in the dielectric layer (Ca/(Ba+Ca)×100) was calculated from obtained results. The results are presented in Table 1.

[Evaluations on Electrical Properties and Service Life Characteristics]

In each of the multilayer ceramic capacitors obtained in the individual Examples and Comparative Example, the following relative dielectric constant, temperature characteristics of capacitance, and high-temperature load service life (High Accelerated Life Test, HALT) were evaluated.

(Specific Dielectric Constant)

Specific dielectric constant (ε) was calculated from capacitance measured under conditions of temperature 25° C., 1 kHz, and 0.5 Vrms.

(Temperature Characteristics of Capacitance)

Temperature change rates (ΔC) of capacitance at −55° C., +25° C., +85° C., and +105° C. were individually measured with reference to capacitance at +25° C. If all temperature change rates (ΔC) of capacitance fell within ±22%, it was considered as one which satisfied X6S property of EIA standard (ΔC is within ±22%, in a temperature range of −55° C. to +105° C.).

(High-Temperature Load Service Life (High Accelerated Life Test, HALT))

The individual multilayer ceramic capacitors obtained in Examples and Comparative Example were held in an applied state of a DC voltage of 100 V/µm at 125° C., and time elapsed until a resistance value decreased by one order of magnitude was measured as high-temperature load service life. And, the multilayer ceramic capacitor whose high-temperature load service life became 10,000 minutes or more was considered passed (OK). High-temperature load service life is particularly important when the dielectric layer is made thin.

These results are presented in Table 1.

TABLE 1

| | Average crystalline grain size | | Ca/(Ba + Ca) | Specific dielectric | X6S properties of EIA | HALT test |
|---|---|---|---|---|---|---|
| | BT grain | CT grain | Mol % | constant | standards | result |
| Example 1 | 210 nm | 390 nm | 22 | Approximately 1900 | OK | OK |
| Example 2 | 240 nm | 370 nm | 23 | Approximately 1900 | OK | OK |
| Example 3 | 220 nm | 390 nm | 24 | Approximately 1900 | OK | OK |
| Example 4 | 250 nm | 360 nm | 25 | Approximately 1900 | OK | OK |
| Comparative Example | 200 nm | | 0 | Approximately 2400 | OK | NG |

As shown in Table 1, results of the mole percentage of calcium relative to a total of barium and calcium obtained from the ICP analysis (Ca/(Ba+Ca) mol %) were consistent with the molar ratio of CT and BT used for the main component raw materials in each of Examples.

Also, comparisons between the results of Table 1 show that a longer service life was achieved in the multilayer ceramic capacitors in Examples 1 to 4 than that in Comparative Example. From these results, it became clear that in addition to a high specific dielectric constant and good temperature characteristics of capacitance, an improvement of service life characteristics became possible even when the thickness of the dielectric layer was reduced to 0.6 μm or less by forming the dielectric layer with dielectric ceramic containing barium titanate grains having a core-shell structure and calcium titanate grains having a core-shell structure.

[Ca Concentrations Present in Core Part and Shell Part of CT Grains]

Figure 6:
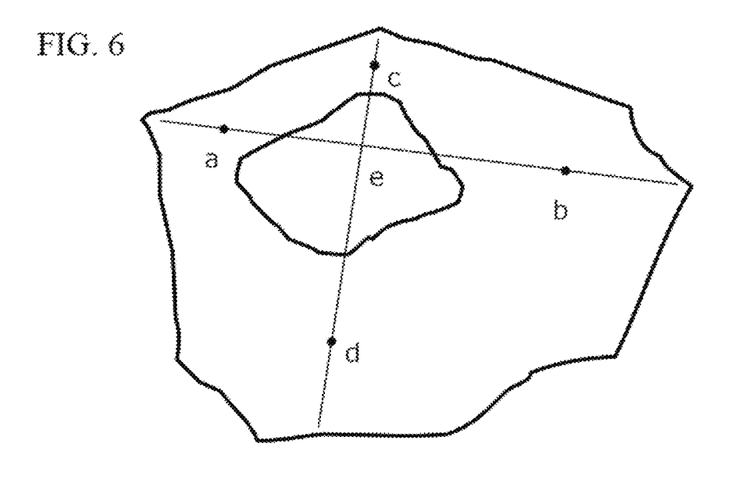
FIG. 6 is a diagram for describing measuring positions of Ca concentration located in a core part and a shell part of CT grains.

Subsequently, by making EDS measurement of a micro region observed with a STEM by the following procedures from (1) to (5) below, a Ca concentration present in each of the core part and the shell part was determined in the CT grains present in the dielectric layer of each of the multilayer ceramic capacitors obtained in Examples 1 to 4. FIG. 6 is a diagram illustrating measuring positions "a" to "e" of Ca concentration.

(1) One straight line having a length which is maximum (a line of a long diameter), among line segments each crossing a core and ended at a grain boundary of CT grains, is drawn, wherein the line of the long diameter is ended at a first edge and a second edge.

(2) The line of the long diameter intersects a core/shell boundary at a first intersecting point and a second intersecting point and is divided into a first line segment defined by the first edge and the first intersecting point in a shell region, a second line segment defined by the first and second intersecting points in a core region, and a third line segment defined by the second intersecting point and the second edge, wherein a midpoint of the first line segment is taken as "a", and a midpoint of the third line segment is taken as "b", as shell measuring positions.

(3) A midpoint of the second line segment is taken as "e", as a core measuring position.

(4) A straight line that passes through the midpoint (e) of the second line segment and is orthogonal to the line of the long diameter (an orthogonal line) is drawn, wherein the orthogonal line is ended at a third edge and a fourth edge along the core/shell boundary. The orthogonal line intersects the core/shell boundary at a third intersecting point and a fourth intersecting point and is divided into a fourth line segment defined by the third edge and the third intersecting point in the shell region, and a fifth line segment defined by the fourth intersecting point and the fourth edge, wherein a midpoint of the fourth line segment is taken as "c", and a midpoint of the fifth line segment is taken as "d", as shell measuring positions.

(5) A mole percentage of Ca (Ca mol %) relative to a sum of mole percentages of Ti and Zr ((Ti+Zr) mol %), or (Ca/(Ti+Zr)), is calculated at each of the measuring positions, and an average value of values obtained at the shell measuring positions "a" to 'd" is taken as a Ca concentration of the shell part, and a value obtained at the core measuring position "e" is taken as a Ca concentration of the core part.

The Ca concentrations of the CT grains thus obtained are presented in Table 2.

TABLE 2

| | Ca concentration in CT grain | | | | | | |
|---|---|---|---|---|---|---|---|
| | Shell part | | | | | Core part | Proportion of core part relative to shell part |
| | Measuring position | | | | | | |
| | a | b | c | d | Average | | |
| Example 1 | 0.28 | 0.32 | 0.17 | 0.12 | 0.223 | 1.31 | 5.89 |
| Example 2 | 0.11 | 0.10 | 0.15 | 0.23 | 0.148 | 1.59 | 10.78 |
| Example 3 | 0.21 | 0.26 | 0.13 | 0.23 | 0.208 | 1.44 | 6.94 |
| Example 4 | 0.15 | 0.26 | 0.19 | 0.22 | 0.205 | 1.52 | 7.41 |

What is claimed:

1. A multilayer ceramic capacitor comprising:
   a plurality of dielectric layers composed of a dielectric ceramic containing
      grains whose main component is barium titanate and each of which has a core-shell structure constituted by a core part and a shell part, and
      grains whose main component is calcium titanate and each of which has a core-shell structure constituted by a core part and a shell part; and
   a plurality of internal electrodes stacked alternately with each of the plurality of dielectric layers.

2. The multilayer ceramic capacitor according to claim 1, wherein a content percentage of Ca present in the core part is higher than a content percentage of Ca present in the shell part in the grains whose main component is the calcium titanate.

3. The multilayer ceramic capacitor according to claim 2, wherein a content percentage of Ca present in the core part is at least four times a content percentage of Ca present in the shell part.

4. The multilayer ceramic capacitor according to claim 1, wherein an average crystalline grain size of grains whose main component is the barium titanate is 200 nm or more and 500 nm or less.

5. The multilayer ceramic capacitor according to claim 1, wherein an average crystalline grain size of grains whose main component is the calcium titanate is 200 nm or more and 400 nm or less.

6. The multilayer ceramic capacitor according to claim 1, wherein a content percentage of at least a rare earth element selected from the group consisting of Ho, Dy, Y, and Yb present in the shell part of each grain whose main component is the barium titanate, and/or in the shell part of each grain whose main component is the calcium titanate, is higher than in the core part of the corresponding grain.

7. The multilayer ceramic capacitor according to claim 1, wherein in the dielectric ceramic, a mole percentage of calcium relative to a total of barium and calcium, or (Ca/(Ba+Ca)×100), is 22 to 25 mol %.

8. The multilayer ceramic capacitor according to claim 1, wherein a content percentage of Zr in the shell part of each grain whose main component is the barium titanate, and/or in the shell part of each grain whose main component is the calcium titanate, is higher than in the core part of the corresponding grain.

9. The multilayer ceramic capacitor according to claim 1, wherein an amorphous phase is present in a grain boundary between at least one grain whose main component is the barium titanate and at least one grain whose main component is the calcium titanate.

10. The multilayer ceramic capacitor according to claim 1, wherein the dielectric ceramic contains one or more elements selected from the group consisting of Mn, Mg, and Si.

11. The multilayer ceramic capacitor according to claim 1, wherein a thickness of each of the dielectric layers is less than 0.6 μm.

12. A method for manufacturing a multilayer ceramic capacitor comprising:

a preliminary step of preparing ceramic raw material powder by blending barium titanate powder and calcium titanate powder having a larger average grain size than the barium titanate powder, and by adding a subcomponent raw material thereto;

a sheet formation step of forming ceramic green sheets by using the ceramic raw material powder obtained in the preliminary step;

a printing step of printing internal electrode patterns on the ceramic green sheets obtained in the sheet formation step;

a stacking step of forming a laminate body by stacking and pressure-bonding the ceramic green sheets after being subjected to the printing step;

a sintering step of obtaining a sintered compact by sintering the laminate body obtained in the stacking step; and an external electrode formation step of forming an external electrode on both of one pair of opposing side surfaces of the sintered compact obtained in the sintering step.

13. The method for manufacturing a multilayer ceramic capacitor according to claim 12, wherein an average grain size of the barium titanate powder is 20 nm or more and 150 nm or less.

14. The method for manufacturing a multilayer ceramic capacitor according to claim 13, wherein an average grain size of the calcium titanate powder is 200 nm or more and 300 nm or less.

15. The method for manufacturing a multilayer ceramic capacitor according to claim 12, wherein the barium titanate powder and the calcium titanate powder are blended at a ratio of 78:22 to 75:25 into the ceramic raw material powder.

16. The method for manufacturing a multilayer ceramic capacitor according to claim 12, wherein at least one rare earth element selected from the group consisting of Ho, Dy, Y, and Yb, and at least one element selected from the group consisting of Zr, Mg, Mn, and Si are added in the form of oxide or in the form of a compound other than oxide as a subcomponent raw material.

17. The method for manufacturing a multilayer ceramic capacitor according to claim 12, wherein a sintering additive is added to the ceramic raw material powder.

* * * * *